June 2, 1925.  
E. NITZSCHE  
COTTON CHOPPER  
Filed June 9, 1923  
1,540,561  
5 Sheets-Sheet 4

Inventor  
E. Nitzsche  
By *[signature]*  
Attorney

June 2, 1925.
E. NITZSCHE
COTTON CHOPPER
Filed June 9, 1923 5 Sheets-Sheet 5
1,540,561
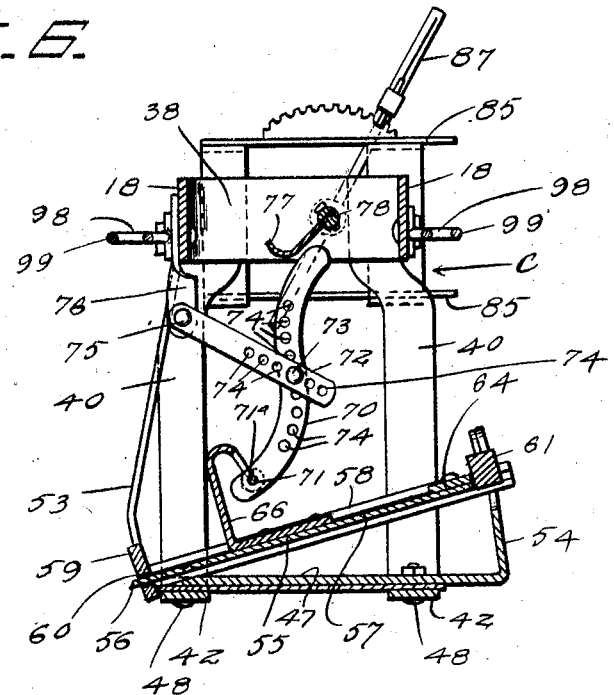
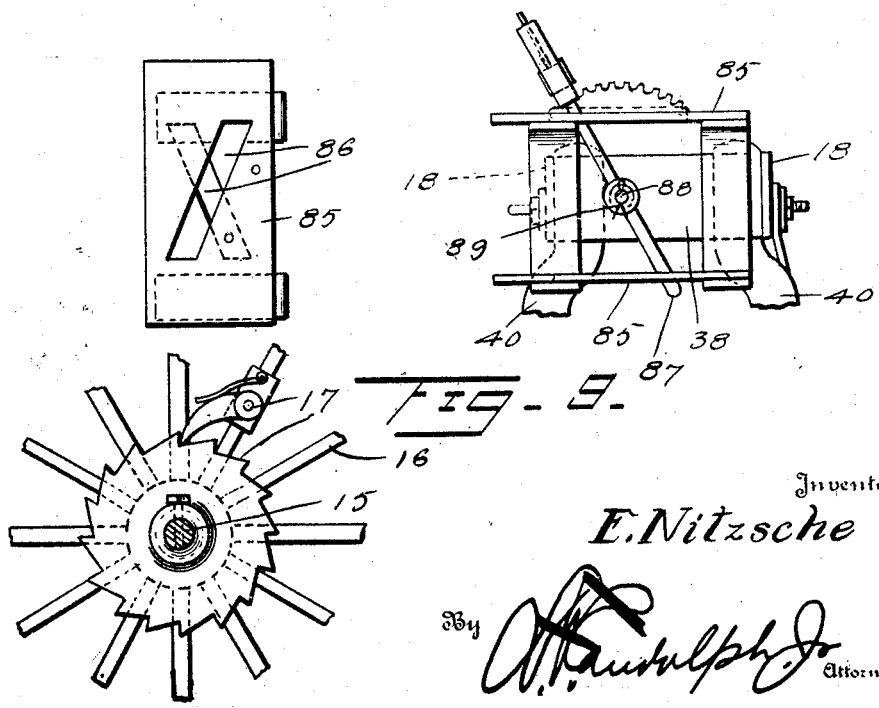
Inventor
E. Nitzsche Patented June 2, 1925.

1,540,561

UNITED STATES PATENT OFFICE.

EWALD NITZSCHE, OF BURTON, TEXAS.

COTTON CHOPPER.

Application filed June 9, 1923. Serial No. 644,400.

*To all whom it may concern:*

Be it known that I, EWALD NITZSCHE, a citizen of the United States, residing at Burton, in the county of Washington and State of Texas, have invented certain new and useful Improvements in Cotton Choppers; and I do hereby declare the following to be a full, clear, and exact description of the invention, such as will enable others skilled in the art to which it appertains to make and use the same.

This invention relates to a cotton chopper or machine for thinning cotton or other plants in lieu of manual operation by a hoe.

It is aimed to provide an implement of this character of generally improved construction, which is efficient in operation, durable, and capable of manufacture and marketing at minimum expense.

Among the general objects, may be mentioned the provision of a chopping means which is adjustable laterally of a supporting frame to adapt itself to the rows of cotton plants; to provide a chopper that is laterally reciprocable, preferably removable and adjustable and mounted by novel means; to provide means whereby the chopping means is vertically adjustable in parallelism with the ground and which may particularly utilize a lever means and a cam means; to provide a construction in which the chopping means may be readily thrown into or out of gear, and to provide a novel foot control or means to vary the lateral position of the chopping means with respect to the frame.

Additional objects and advantages will be pointed out and become apparent from a consideration of the description following taken in connection with accompanying drawings illustrating one operative embodiment.

In said drawings:—

Figure 6 is a cross sectional view on the line 6—6 of Figure 5;

Figure 7 is a plan view of the clutch plate bracket for the operating mechanism of the stopper;

Figure 8 is a rear elevation of the part of Figure 7 and adjacent parts of the machine, and Figure 9 is a fragmentary elevation illustrating the ratchet connection between one of the ground wheels and the main shaft.

Like reference characters designate like or similar parts in the different views.

Figure 1:
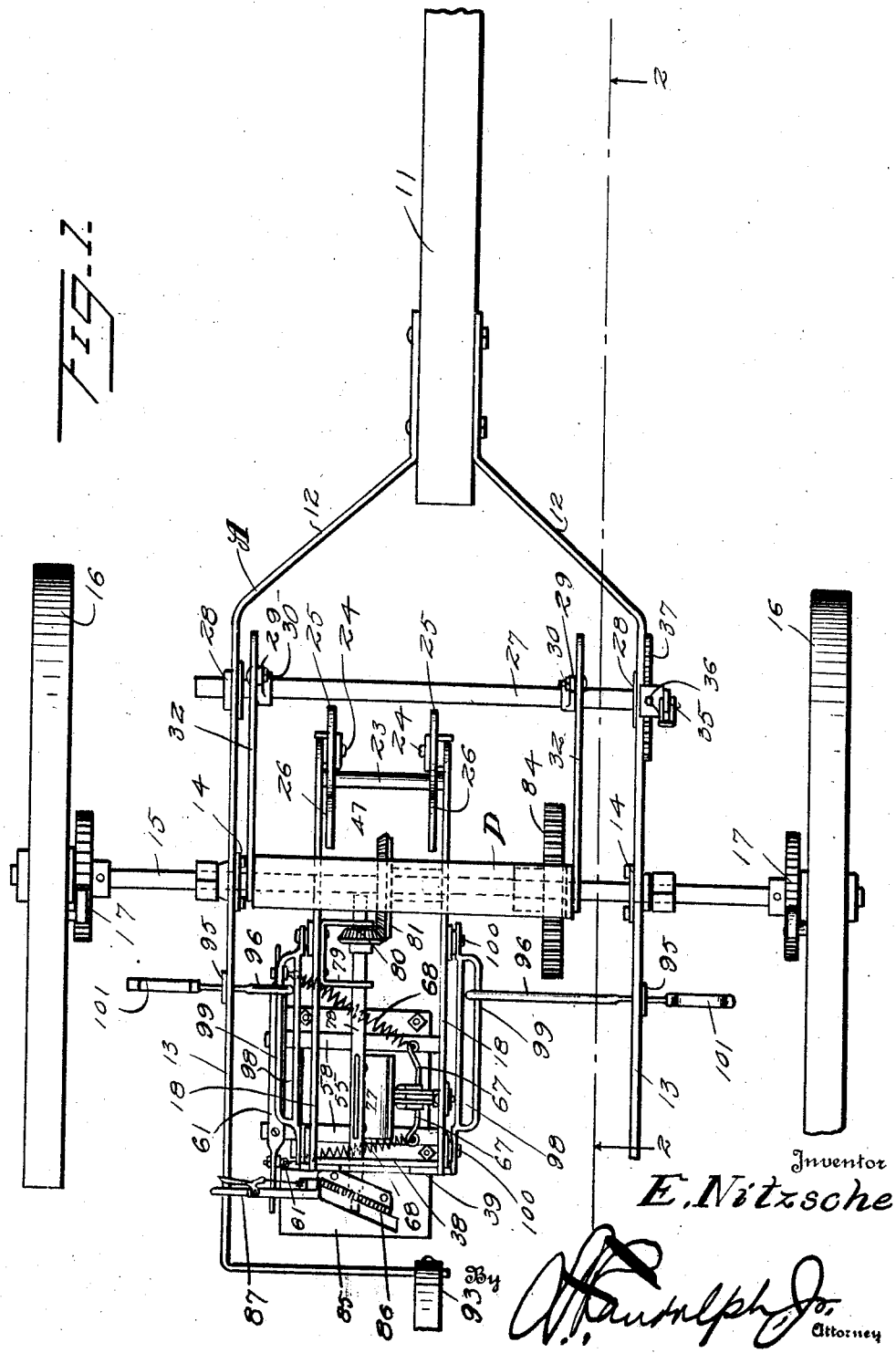
Figure 1 is a plan view of the machine.
Figure 2:
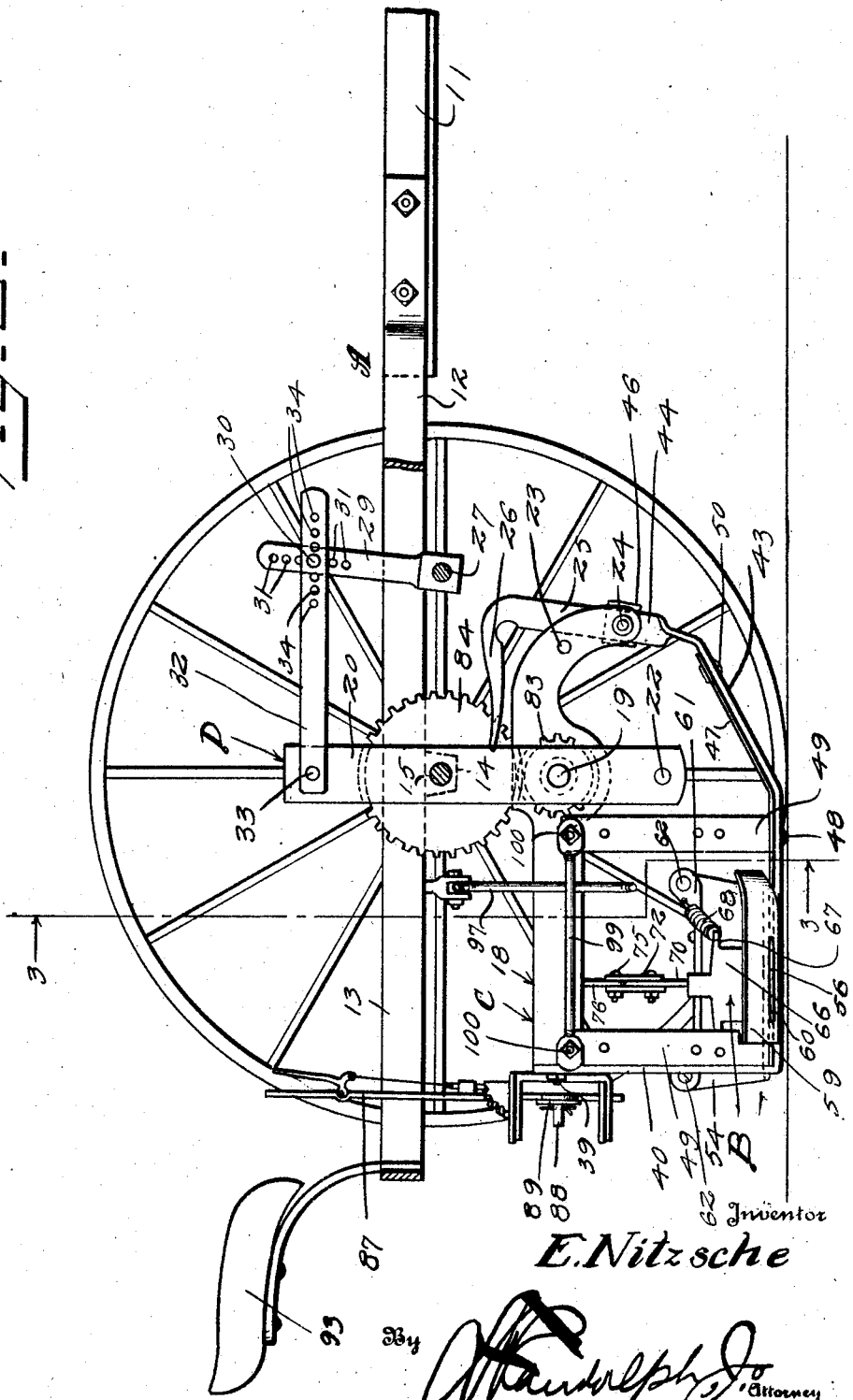
Figure 2 is a cross sectional view taken on the line 2—2 of Figure 1.
Figure 3:
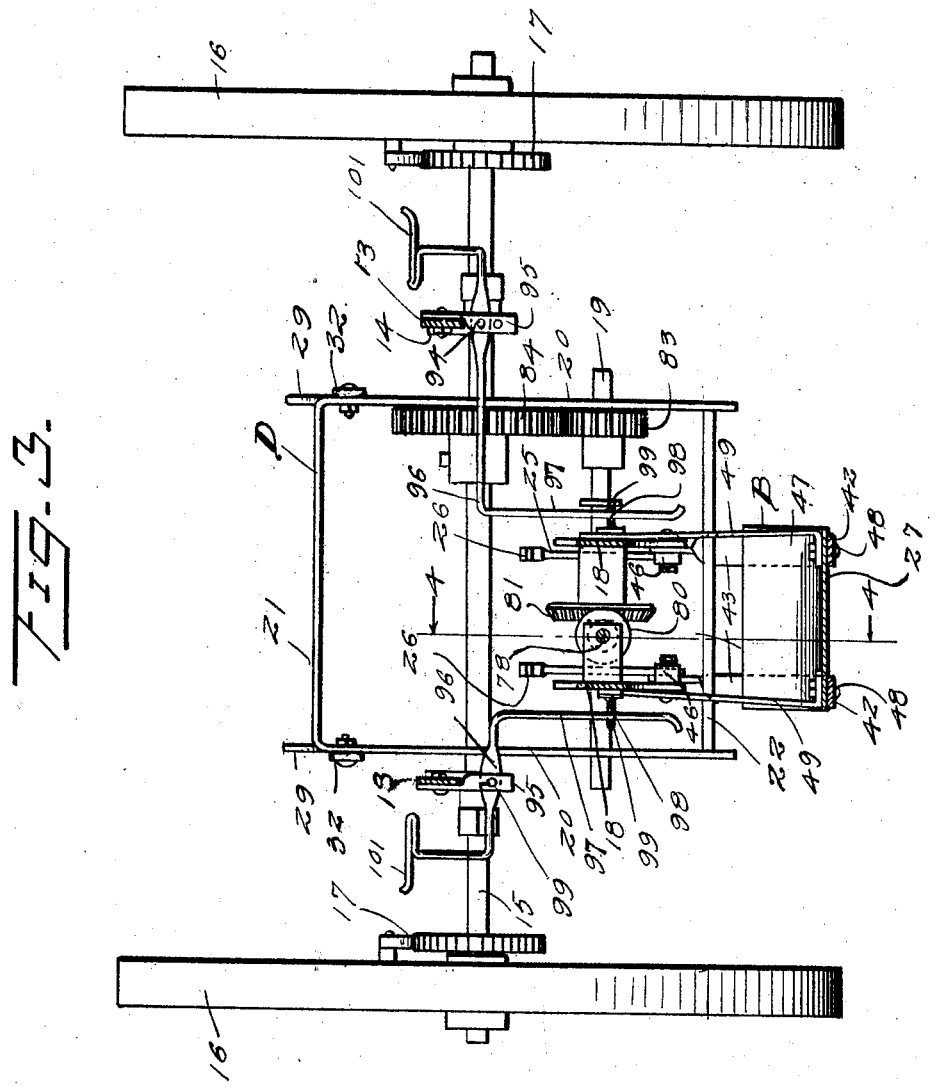
Figure 3 is a cross sectional view taken on the line 3—3 of Figure 2.
Figure 4:
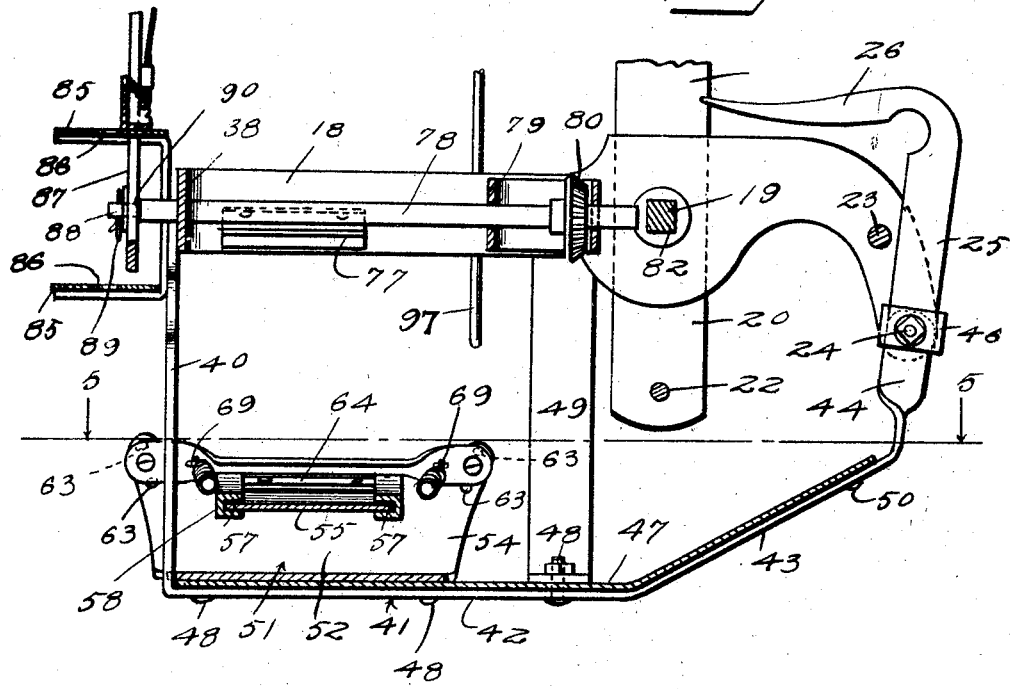
Figure 4 is a cross sectional view taken on the line 4—4 of Figure 3.
Figure 5:
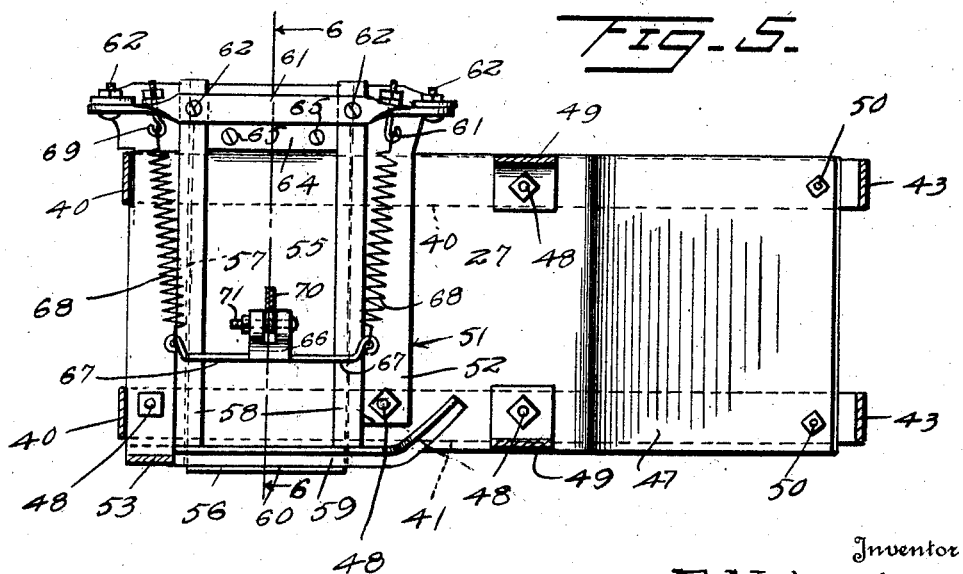
Figure 5 is a cross sectional view taken on the line 5—5 of Figure 4.

Referring specifically to the drawings, a main frame is employed at A, being for instance substantially rectangular and having a draft tongue 11 extending forwardly therefrom. The machine may be drawn by animal power or by a tractor as preferred, suitably hitched to the tongue 11. Frame A essentially consists of suitable metallic beams or bars 12 as shown which may have parallel side portions 13 provided with depending hangers or bearings 14, in which a main shaft or axle 15 is journaled. Ground wheels 16 are positioned on the shaft 15 and preferably have ratchet connection therewith as at 17 to the end that when the machine travels forwardly, movement of wheel 16 will rotate said shaft 15, but should the wheels move backwardly, they would rotate on the shaft 15 and thus move independently of it so as not to disturb the chopping mechanism which will be hereinafter specifically referred to.

A chopper is shown generally at B and is carried by a frame generally designated C.

Chopper frame C may have spaced side plates 18 in which a shaft 19 is journaled.

A positioning and supporting frame D is provided for the chopper B and its frame C. Frame D may be generally rectangular as shown consisting of a metallic bar provided with sides 20, a connecting bridge 21 integral therewith and a rod 22 connecting the distal ends of the sides 20. Intermediate bridge 21 and rod 22, sides 20 have the main shaft 15 journaled therein. Shaft 19 is also journaled in the sides 20 intermediate the main shaft and rod 22.

Side plates 18 may be of any suitable shape but are preferably curved downwardly at their forward ends which are connected by a rod 23. Rigidly fastened by bolts 24 to said forward ends of plates 18 are upstanding bars 25 provided with rearwardly extending cams 26. Adapted to bear against the cams 26 is a transverse rod 27 which is journaled in bearings or hangers 28 depending from the side portions 13. Crank arms 29 rise from the rod 27 rigidly and are pivotally and adjustably connected by means of bolts 30 and openings or apertures 31, to links 32 which are adjustably and pivotally fastened to the sides 20 as by bolts 33 passing through the links and selected openings or apertures of series 34. An operating lever 35 is rigidly connected with rod 27 and may be maintained in its different adjusted positions by a conventional plunger 36 thereon coacting with a locking plate or sector 37 carried by one of the side portions 13. Through the adjustment of lever 35, the positioning and operating frame D will be swung on the main shaft or axle 15 and the rod 27 moved along the cam 26, thereby varying the elevation of the chopper B and its frame C, and at the same time maintaining such chopper mechanism B in parallelism with the ground.

At the rear of chopper frame C, the side plates 18 are joined by a cross bar 38. Bolted or otherwise fastened at 39 to cross bar 38 are depending uprights 40 which extend from longitudinal runners 41 having portions 42 parallel with the ground and upwardly extending portions 43 secured by ears 44 to the forward ends of side plates 18 and the lower ends of bars 25 as by means of the bolts 24 which also secure the U-shaped clamps 46 at that point in order to make the connection rigid. Runners 41 are adapted to travel on or relatively close to the ground and on their upper surface support a fender plate 47 which prevents the entrance of undue soil and trash into the machine from below. Plate 47 at its forward end upwardly inclines in accordance with the inclination of portions 43 and such plate is fastened to the runners in any suitable manner as by bolts 48. Uprights 49 depend from the side plates 18 and are secured to the plates 47 and runners 41 by certain of the bolts 48. Bolts 50 pass through the plate 47 and the portions 43.

The chopper mechanism B has a mounting bracket 51 including a relatively large plate 52 disposed on the plate 47 and fastened in place by certain of the bolts 48. At one side, an upright 53 integral with the plate 52 rises while at the other side an upstanding wall 54, also integral with the plate, is provided.

A chopper blade 55 is sharpened at its lower or cutting edge as at 56. This blade 55 is inclined upwardly and rearwardly from its cutting edge and is slidably disposed in grooves 57 of track members 58. Track members 58 are connected at their forward ends by a guide and scraper element 59 having a slot 60 therein through which the blade 55 moves. An attaching bar 61 is bolted or otherwise fastened at 62 to the track members 58 and the ends thereof extend beyond the track members and are adjustably and detachably fastened by bolts 62 passing therethrough and selectively through openings of a series 63 provided through a wall 54. The upper or non-cutting end of blade 55 has a back 64 detachably secured thereto as by bolts 65 so that the same may be removed to permit removal of the blades from the track members 58 at the rear thereof for sharpening or otherwise.

Fastened against the upper surface of the blade 55 is a bracket 66 having ears 67 to which contractile coil springs 68 are detachably fastened at one end. At the other end, said springs 68 are detachably hooked or fastened to hooks 69 carried by the attaching bar 61. A lever 70 is pivoted at 71 by means of a detachable bolt 71ª to bracket 66 and is pivotally and adjustably connected to a link 72 by a removable bolt 73 passing selectively through openings or apertures 74 in said link 72 and lever 70. Link 72 is pivoted at 75 to a lug 76 on one of the side plates 18.

The upper end of lever 70 is free and is periodically engaged by a trip 77 in order to rapidly reciprocate the chopper blade 55 into and out of engagement with adjacent cotton or other plants to thereby sever them and thin them. Trip 77 is carried by a shaft 78.

Shaft 78 is slidably mounted and journaled in the cross bar 38 and in a bracket 79 depending inwardly from and fastening to one of the slide plates 18. A bevel gear wheel 80 is keyed to shaft 78 and adapted to mesh with a bevel gear wheel 81 disposed on a square portion 82 of the shaft 19 and which shaft 19 has said gear wheel 81 and the side plates 18 laterally slidable thereon. Also a gear wheel 83 is keyed to the shaft 19 in constant mesh with a larger gear wheel 84 keyed to the main shaft or axle 15. In this manner, movement of the main shaft or axle through travel of the ground wheels results in reciprocation of the chopper blade 55.

Horizontal plates 85, in vertically spaced relation, extend outwardly from the uprights 49 and have diagonal slots 86 therethrough. Said slots are crossed with respect to each other and have their centers vertically coincident. An operating lever 87 is journaled on a reduced portion 88 of shaft 78, being held against longitudinal displacement as by a washer and cotter 89 at one side and a shoulder 90 at the other side. This lever 87 is disposed in the slots 86 and as it is swung on shaft 78 as a fulcrum, it imparts longitudinal movement to said shaft which accordingly moves the gear wheel 80 into and out of mesh with the gear wheel 81 to thereby throw the chopper blade 55 into and out of operation at will. Lever 87 may be locked in its different positions by a plunger 91 thereon coacting with a locking plate or sector 92 on one of the plates 85.

The driver's or operator's seat is provided at 93, on the rear of the frame A. Lever 87 is located relatively close to the seat so that the operator may readily manipulate it while seated. Pivoted on horizontal pivots such as bolts 94 fastened to depending lugs 95 on the side portions 13, are shifting levers 96 for the chopper frame C. Levers 96 have dependents 97 which are disposed in longitudinally elongated slots 98 of guide brackets 99 bolted as at 100 to the side portions 18. Several of the bolts 100 secure the uprights 49 and 50 to the main frame A. The upper end of levers 96 terminate in pedals 101 adapted to be engaged by the foot of the operator in order to be tilted from their fulcrums and accordingly slide the chopper frame C along the shaft 19 in order to properly position the chopper blade 55 with respect to the plants.

The different uprights above the blade 55 may have a shield or fender plate, not shown, fastened thereto with a view to excluding trash and dirt from the chopper mechanism B.

In operation, the machine is drawn by a preferred draft power with the mechanism D and frame C located between the rows of cotton or plants to be thinned. The operator seated at 93 may thereupon place his feet in engagement with the pedals 101 and appropriately shift the levers 96 so as to slide the frame C transversely of the frame A and along the shaft 19 until it is in the desired position. The operation of the wheels 16 rotates the main shaft or axle 15 which through the medium of the gear wheels 84 and 83 drives the shaft 19 and bevel gear wheel 81. With the gear wheel 80 in mesh with gear wheel 81, shaft 78 is rotated which accordingly rotates the trip 77 moving it alternately into and out of engagement with the distal end of the lever 70 thereby reciprocating that lever and causing it to correspondingly reciprocate the chopper blade 55 so that it appropriately cuts or thins the cotton in its path of movement, to the desired extent. The lever 87 is operable at will from the driver's seat in order to slide the shaft 78 so as to throw the gear 80 into or out of mesh with the gear 81. Also the chopper blade 55 may be removed at times for sharpening or other purposes by detaching the attaching bar 61, the back 56, the springs 68 and the pivot bolts 71. Also, the lever 35 is readily operable at all times in order to swing the frame D and engage rod 22 with cams 26, thus varying the elevation of frame C and chopper mechanism D in parallelism to the ground.

Various changes may be resorted to within the spirit and scope of the invention.

I claim as my invention:—

1. In a machine of the class described, a chopper frame, chopper means carried thereby, a positioning frame to which said chopper frame is pivoted, and cam means associated with one of said frames to coact with the other of said frames to permit adjustment of the chopper frame and chopper means in substantial parallelism to the ground.

2. In a machine of the class described, a main frame, an axle associated therewith, a positioning frame adapted to fulcrum on said axle, means operable to shift the positioning frame, a chopper frame fulcrumed on said positioning frame, cam means on one of said frames to coact with the first mentioned means; whereby the chopper frame may be moved in substantial parallelism with the ground, and a chopper means carried by said chopper frame.

3. In a machine of the class described, a chopper frame, chopper means carried by said frame, a positioning frame to which the chopper frame is pivoted, and cam means to coact through movement of the positioning frame to maintain the chopper frame in substantial parallelism with the ground.

4. In a machine of the class described, a main frame, a rod journaled thereon, a positioning frame operable through movement of said rod, a chopper frame pivotally connected to the positioning frame, chopper means carried by the chopper frame, and a cam carried by the chopper frame in coacting relation to said rod to maintain the chopper frame in parallelism with the ground.

5. In a machine of the class described, a main frame, ground wheels, an axle therefor associated with the main frame, a positioning frame pivoted on said axle, a rod rotatable on said main frame, a crank and link connection between said rod and positioning frame, a lever to operate said rod, a shaft journaled on said positioning frame, a chopper frame through which said shaft passes, chopper means carried by the chopper frame, a cam carried by the chopper frame in coacting relation to said rod, whereby adjustment of the chopper frame will be in substantial parallelism with the ground.

6. In a machine of the class described, a main frame, ground wheels, an axle therefor associated with the main frame, a positioning frame pivoted on said axle, a rod rotatable on said main frame, a crank and link connection between said rod and positioning frame, a lever to operate said rod, a shaft journaled on said positioning frame, a chopper frame through which said shaft passes, chopper means carried by the chopper frame, a cam carried by the chopper frame in coacting relation to said rod, whereby adjustment of the chopper frame will be in substantial parallelism with the ground, said axle being in driving relation with the ground wheels, a driving connection between said axle and said shaft, and a driving connection for the chopper means between the same and said shaft.

7. In a machine of the class described, a chopper frame, a main frame, and means on the main frame operatively connected to the chopper frame to bodily move the same laterally with respect to the main frame, consisting of levers pivoted on the main frame and clip connections between said levers and the chopper frame to vary the position of operation of the chopper frame.

8. In a machine of the class described, a chopper frame, a main frame, means on the main frame operatively connected to the chopper frame to move the same laterally with respect to the main frame, consisting of levers pivoted on the main frame and clip connections between said levers and the chopper frame, dependents on the levers and brackets on the chopper frame engaged by the dependents, and pedals for said levers.

9. A machine of the class described, a chopper member, a lever pivoted to the chopper member, a link connection to position the lever, and trip means coacting with the lever.

10. A machine of the class described having a chopper member, a spring to urge retraction of said member, a lever rising from said member, trip means coacting with the distal ends of said lever to periodically project the chopper member, and a link connection to position said lever engaging the lever below the trip means.

11. In a machine of the class described, a chopper member, a bracket rising from said chopper member, a return spring connected to said bracket, a lever pivoted to and rising from said bracket, a positioning means engaging said lever at a distance below its upper end, and a trip means to periodically engage the upper end of said lever.

12. In a machine of the class described, a bracket having an upstanding wall and a substantially horizontal portion, track means resting on said portion adjacent one end thereof, means detachably securing the track means adjacent the other end thereof to said wall and elevated with respect to the front end, a chopper member slidable on the track means, and means to actuate the slidable member.

13. In a machine of the class described, a bracket having an upstanding wall and a substantially horizontal portion, track means resting on said portion adjacent one end thereof, means detachably securing the track means adjacent the other end thereof to said wall and elevated with respect to the front end, a chopper member slidable on the track means, means to actuate the slidable member, a frame carrying said bracket, and an upright integral with said portion and forming part of said frame.

14. A machine of the class described having a chopper frame including side plates, a shaft on which said side plates are slidable, a bracket on one of said side plates, and a lever coacting with said bracket to slide the chopper frame, and chopper means carried by said chopper frame.

15. A machine of the class described having a chopper frame, chopper means carried by said frame, a shaft on said frame, means to operate the chopper means from said shafts, a gear wheel on said shaft, a positioning frame, a second shaft, said second shaft pivotally connecting the chopper frame to the positioning frame, a gear wheel on the second shaft to mesh with the first mentioned gear wheel, a driving shaft on which the positioning frame is pivoted, and means to drive the second shaft from the driving shaft.

16. A machine of the class described having a chopper frame, chopper means carried by said frame, a shaft on said frame, means to operate the chopper means from said shaft, a gear wheel on said shaft, a positioning frame, a second shaft, said second shaft pivotally connecting the chopper frame to the positioning frame, a gear wheel on the second shaft to mesh with the first mentioned gear wheel, means to drive the second shaft from the driving shaft, means to throw the chopping means out of gear.

17. A machine of the class described having a chopper frame, chopper means carried by said frame, a shaft on said frame, means to operate the chopper means from said shaft, a gear wheel on said shaft, a positioning frame, a second shaft, said second shaft pivotally connecting the chopper frame to the positioning frame, a gear wheel on the second shaft to mesh with the first mentioned gear wheel, means to drive the second shaft from the driving shaft, the second shaft having a square portion, the second gear wheel having a square opening receiving said square portion slidably, and the chopper frame being laterally slidable on the second shaft.

18. A machine of the class described having a chopper frame, chopper means carried by said frame, a shaft on said frame, means to operate the chopper means from said shaft, a gear wheel on said shaft, a positioning frame, a second shaft, said second shaft pivotally connecting the chopper frame to the positioning frame, a gear wheel on the second shaft to mesh with the first mentioned gear wheel, means to drive the second shaft from the driving shaft, and means operable to slide the first mentioned shaft to throw the chopper mechanism out of gear.

In testimony whereof I affix my signature in presence of two witnesses.

EWALD NITZSCHE.

Witnesses:
HERBERT NIENSTEELT,
WM. NIENSTEELT.